United States Patent [19]

Nussbaum et al.

[11] Patent Number: 4,703,278
[45] Date of Patent: Oct. 27, 1987

[54] WELL LOGGING DISC COIL RECEIVING MEANS AND METHOD

[75] Inventors: Theodore W. Nussbaum; Keith R. Tooker; Percy T. Cox, all of Houston, Tex.

[73] Assignee: Texaco Inc., White Plains, N.Y.

[21] Appl. No.: 658,928

[22] Filed: Oct. 9, 1984

[51] Int. Cl.⁴ .................................... G01V 3/26
[52] U.S. Cl. ........................... 324/344; 324/338
[58] Field of Search ................. 324/332–347; 343/895, 793, 860, 861; 336/200–208

[56] References Cited

U.S. PATENT DOCUMENTS

| | | | |
|---|---|---|---|
| 2,266,262 | 12/1941 | Polydoroff | 343/788 X |
| 2,650,304 | 8/1953 | Schlesinger | 343/743 |
| 2,757,287 | 7/1956 | Stanley | 343/788 X |
| 2,981,950 | 4/1961 | Skidmore | 343/788 |
| 3,078,348 | 2/1963 | McIntosh | 343/788 X |
| 3,181,057 | 4/1965 | Bravenec | 324/339 X |
| 3,503,007 | 3/1970 | Kutschbach | 324/236 X |
| 3,551,797 | 12/1970 | Gouilloud et al. | 324/338 |
| 3,638,112 | 1/1972 | Lasater et al. | 343/788 X |
| 3,641,576 | 2/1972 | Fartanish | 343/743 |
| 3,866,111 | 2/1975 | Warren | 324/344 X |
| 3,891,916 | 6/1975 | Meader et al. | 324/341 |
| 3,956,751 | 5/1976 | Herman | 343/895 X |
| 4,095,169 | 6/1978 | Musd | 324/345 |
| 4,253,079 | 2/1981 | Brosh | 336/200 X |
| 4,401,947 | 8/1983 | Cox | 324/338 |
| 4,407,000 | 9/1983 | Sasaki et al. | 343/788 X |
| 4,514,693 | 4/1985 | Meader | 324/341 X |

FOREIGN PATENT DOCUMENTS

| | | | |
|---|---|---|---|
| 2754221 | 6/1979 | Fed. Rep. of Germany | 336/208 |
| 0153408 | 7/1982 | Japan | 336/208 |
| 2125225 | 2/1984 | United Kingdom | 343/741 |
| 0697802 | 5/1979 | U.S.S.R. | 324/208 |

Primary Examiner—Reinhard J. Eisenzopf
Assistant Examiner—Warren S. Edmonds
Attorney, Agent, or Firm—Robert A. Kulason; James J. O'Loughlin; Ronald G. Gillespie

[57] ABSTRACT

The present invention is a well logging receiver coil system which includes a coil. The system also includes a variable capacitor connected across the coil to form a resonant circuit tuned to a predetermined frequency. The coil in the presence of an electromagnetic field has a current induced therein representative of the strength of the electromagnetic field. A pick-off circuit is connected to the coil in a predetermined manner and provides a signal representative of the strength of the magnetic component of the electromagnetic field substantially unaffected by the electrical field component of the electromagnetic field.

27 Claims, 5 Drawing Figures

WELL LOGGING DISC COIL RECEIVING MEANS AND METHOD

BACKGROUND OF THE INVENTION

Field of the Invention

The present invention relates to well logging systems and methods in general and, more particularly, to well logging systems and methods whereby an electromagnetic energy is propagated and received by way of an earth formation.

SUMMARY OF THE INVENTION

The present invention is a well logging receiver coil system which includes a coil. The system also includes a variable capacitor connected across the coil to form a resonant circuit tuned to a predetermined frequency. The coil in the presence of an electromagnetic field has a current induced therein representative of the strength of the electromagnetic field. A pick-off circuit is connected to the coil in a predetermined manner and provides a signal representative of the strength of the magnetic component of the electromagnetic field substantially unaffected by the electrical field component of the electromagnetic field.

The objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and not to be construed as defining the limits of the invention.

DESCRIPTION OF THE INVENTION

The induction well logging, dielectric constant well logging, resistivity well logging or any well logging where the well logging system utilizes coils to receive energy transmitted into an earth formation from a borehole, there has been a consistent problem of energy from an electric field interfering with the measurement of a magnetic field. An example of a resistivity well logging system is described and disclosed in U.S. Pat. No. 4,401,947, which is hereby incorporated into this application. An example of a dielectric constant well logging system is described and disclosed in U.S. application Ser. No. 579,316; filed Feb. 13, 1984, which is hereby incorporated into this application.

Figure 1:
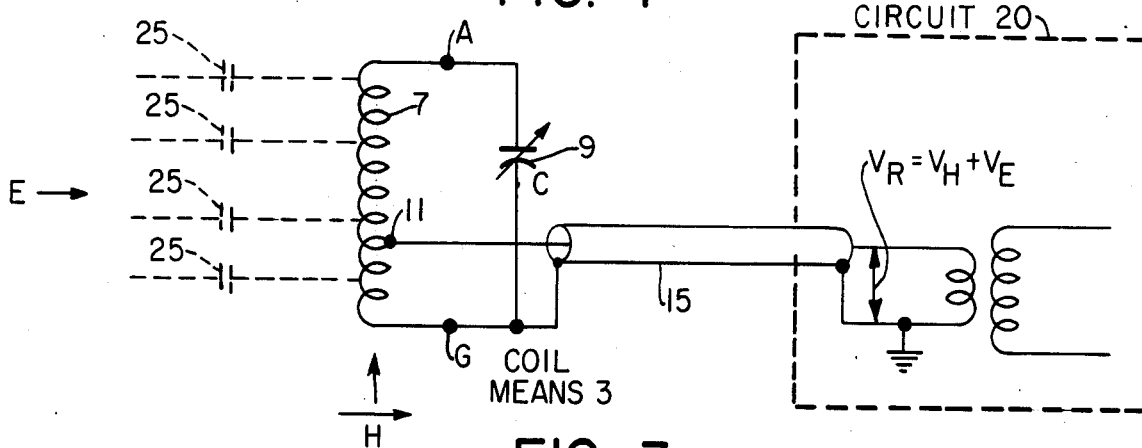

With reference to FIG. 1, a conventional coil receiving system includes receiver coil means 3, located in a logging sonde (not shown). Receiver coil means 3 includes a coil 7 and a variable capacitor 9, connected in parallel across connections A and G, which form a resonant circuit tuned to the frequency of energy transmitted by a transmitter coil (not shown). The measured component of energy is picked off of coil 7 at connection 11 and connection G. Connections 11 and G are connected to the inner conductor and to the sheath, respectively, of a coaxial cable 15 which in turn is connected to conventional receiver input circuit 20. Receiver input circuit 20 may represent a portion of a receiver circuit in the well logging sonde or the entire receiver circuit. Obviously in multicoil well logging systems, the foregoing would be repeated for each receiver coil means 3.

Receiver coil means 3 will unfortunately not only measure magnetic field H, which is desired, but will also include in the measurement the effects of electric field E due to parasitic capacitance 25 which inherently connects each receiver coil means 3 to any other physical structure, such as the earth formation.

Figure 2:
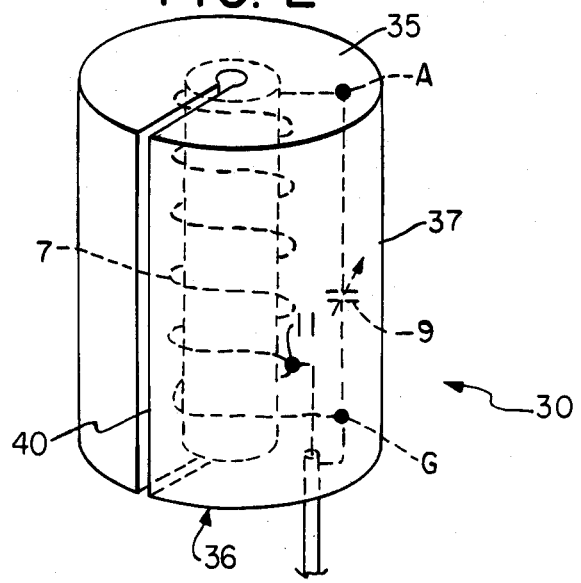
FIGS. 1 and 2 depict schematic representation of prior art coil receiving means.

With reference to FIG. 2, receiver coil means 3 was replaced with the now conventional receiver coil means 30 which is described and disclosed in U. S. Pat. No. 4,401,947 hereby incorporated by reference into this application. Basically the only difference between receiver coil means 3 and receiver coil means 30 is that the elements of receiver coil means 3 have been placed inside a cylindrical metal shield having a body 37 and end plates 35 and 36. There is a slotted opening 40 running from the center of end plate 35, down body 37 and back across end plate 36 to its center. The shield did improve the magnetic field H measurements by shielding out a substantial portion of the electric field E. However even this approach still experiences problems. Most notably there still exist current losses through end plates 35 and 36 and a voltage exists across slotted opening 40.

Figure 3:
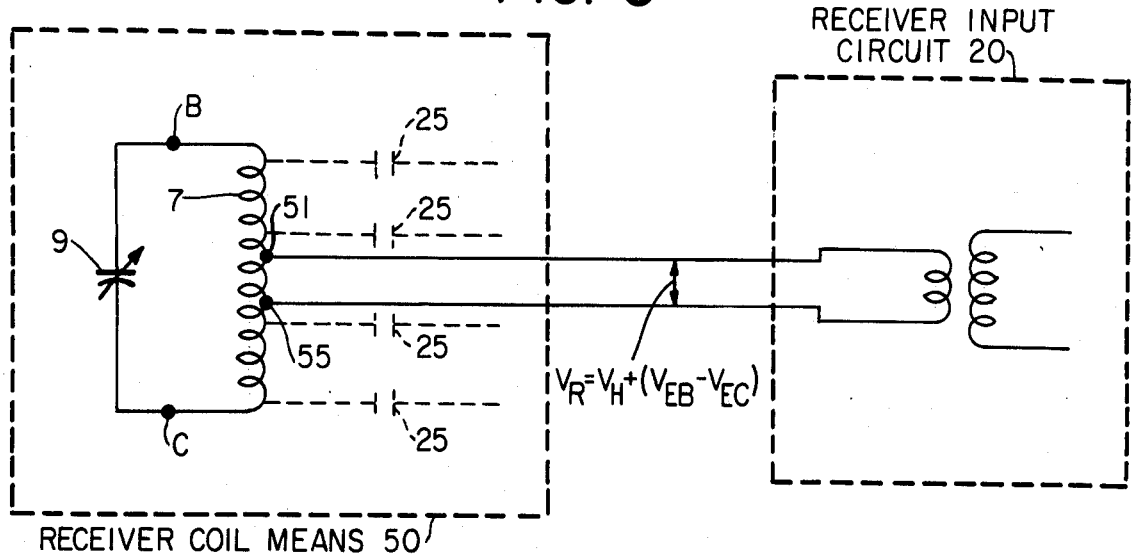
FIG. 3 is a schematic representation of a coil receiving means constructed in accordance with the present invention.

The present invention either completely eliminates the effect of the electric field E or reduces the effect to a negligible portion. With reference to FIG. 3, receiver coil means 50 includes coil 7 and adjustable capacitor 9. However the pick-off connections are not connections 11 and G but are centrally located selected connections 51 and 55. Further, connections 51, 55 may be connected to receiver circuit means 20 by wires instead of coaxial cable.

The output caused by the electric field is cancelled out if connections 51 and 55 are balanced astride the mid-point of coil 7. Even if connections 51 and 55 are not perfectly balanced across the mid-point of coil 7, the error is negligible. This cancellation is due to the physical property of the coil that the electric field caused output voltage $V_{EB}$ is equal to and 180° out of phase with the electric field caused output voltage $V_{EC}$. Voltages $V_{EB}$ and $V_{EC}$ are the output voltages produced by electric field coupling to each half of the coil from the midpoint to each end B and C, respectively.

As noted earlier, even if a perfect balance is not achieved, the resultant effect of electric field E is negligible. It is assumed that for a perfect balanced pick-off, voltage $V_{EB}$ is approximately one-half of voltage $V_E$ as shown in FIG. 2. However, if a near but not perfect balance is achieved, for example one voltage such as voltage $V_{EB}$ may be slightly greater than the other voltage $V_{EC}$. Due to the out-of-phase subtraction, the voltage difference $V_{EB}-V_{EC}$ will be substantially less than even the smaller of the two $V_E$ voltages.

The previous embodiment and the prior art, although not specifically stated are cylindrical receiver coils mounted on conventional coil cores. In another embodiment of the present invention, the perfect type balance referred to previously can be achieved with a coil design as shown in FIGS. 4 and 5.

Figure 4:
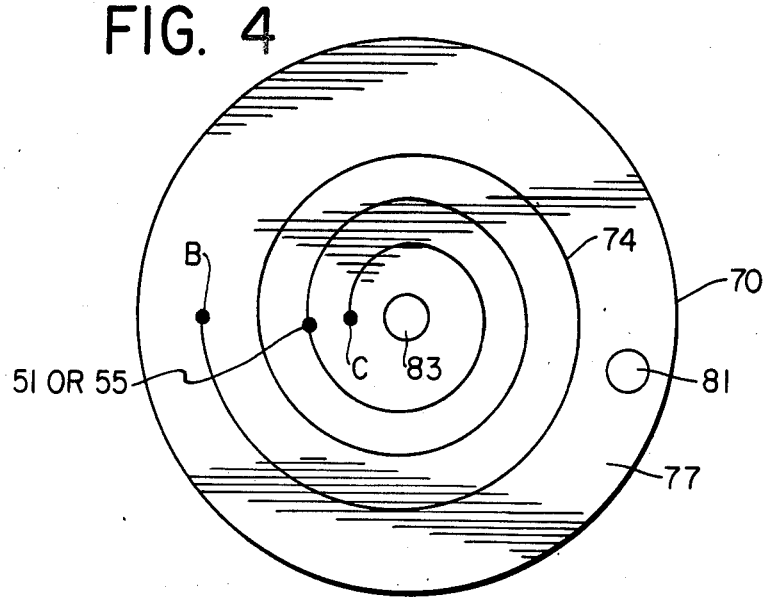
FIG. 4 is a pictorial representation of another embodiment of the present invention which is a flat disc-type coil.

With reference to FIG. 4 a flat disk 70 which is made of a non-conductive material on which a conductive path 74 has been printed in a spiral manner on a surface 77 and having connection B at one end of the conductive path 74 and connection C at the other end of conductive path 74. Disk 70 has holes 81 and 83 whose function will be described hereinafter. As explained hereinafter, only those disks 70 which will be used for picking-off the signal will have a pick-off connection 51 or 55 which is signified by the indicator line to the numeric indicator 51 or 55.

Figure 5:
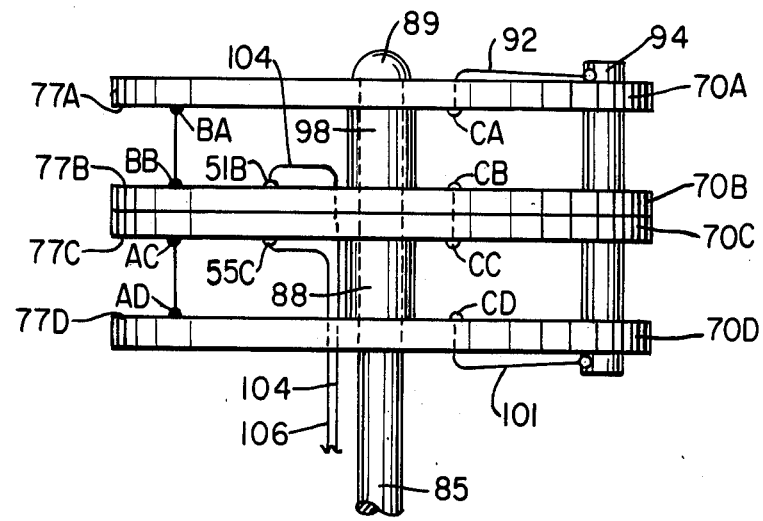
FIG. 5 shows a receiving coil system constructed in accordance with the second embodiment of the present invention.

A coil of sufficient turns can be created as is shown in FIG. 5 using a plurality of disks 70. For purposes of clarification, although all the disks are disks 70, they will be identified as 70A, 70B, 70C and 70D. Further the elements of any disks 70A, 70B, 70C or 70D will have a corresponding alpha suffix with its numeric or alpha designation. A support member 85 passes through center hole 83 of disks 70A through 70D and has disk 70A fastened to it by a nut 89. Disk 70A has its surface 77A with conductive path 74A facing downward and its connection CA connected to one end of a variable capacitor 94 by way of a wire 92. Capacitor 94 passes through holes 81A through 81D of disks 70A through 70D, respectively, and is affixed thereto by conventional fastening methods. A spacer 98 separates disk 70A from disk 70B whose surface 77B is facing surface 77A of disk 70A. The function of spacer 98 is to prevent these two surfaces 77A and 77B of disks 70A and 70B, respectively, from shorting out. Connection BA of the first disk 70A is connected to connection BB of disk 70B. disk 70C is arranged in the same manner as disk 70A and is abutted against disk 70B and has its surface 77B facing downward. Connection CB on disk 70B is connected to connection CC on disk 70C. Connection AC of disk 70C is connected to connection AD of disk 70D which is arranged the same as disk 70B and is separated from disk 70C by a spacer 88. Connection CD of disk 70D is connected to the unconnected end of capacitor 94 by way of a wire 101.

Pick-off connection 51B is made on conductive path 74B of disk 70B and is connected to a wire 104. Pick-off connection 55C is made on conductive path 74C of disk 70C and is connected to a wire 106. Wires 104 and 106 are in turn connected to receiver input circuit 20.

The present invention as hereinbefore described is a well logging system using a balanced pick-off receiver coil to substantially eliminate the electric field component of a signal picked-off from the receiver coil.

What is claimed is:

1. A well logging receiver coil system comprising:
   coil means for having an electromagnetic field induce a current therein representative of the strength of the electromagnetic field, the coil means having two end points and a mid-point located between the two end points;
   variable capacitor means connected across said coil means for forming a resonant circuit with said coil means tuned to a predetermined frequency; and
   pick-off means, said pick-off means being connected to the coil means at two connection points on the coil means in a manner so that two connection points are equidistant from the mid-point of the coil means and with each connection point being located between the mid-point and an end point, for providing a signal representative of the magnetic component of the electromagnetic field strength and having substantially no electric field component of the electromagnetic field strength.

2. A system as described in claim 1 in which the coil means is a cylindrical coil having its ends connected to the variable capacitor means.

3. A system as described in claim 1 in which the coil means includes a plurality of serially connected flat coil disks,
   and mounting means for mounting the plurality of flat coil disks.

4. A system as described in claim 3 in which each flat coil disk includes:
   a disk of non-conductive material,
   a conductive path affixed to said disk in a spiral manner and having a connection A at one end of the conductive path and a connection B at the other end of the conductive path.

5. A system as described in claim 4 in which the number of flat coil disks in said coil means is an even number.

6. A system as described in claim 5 in which a first flat coil disk of the plurality of flat coil disks has its A connection connected to said variable capacitor means and its B connection connected to the B connection of the next subsequent flat coil disk,
   a last flat coil disk of the plurality of flat coil disks has its A connection connected to the variable capacitor means, and its B connection connected to the B connection of the next preceding flat coil disk, and
   each flat coil disk of the plurality of flat coil disks, except for the first and last flat coil disks, has its A connection connected to the A connection of an adjacent flat coil disk and its B connection connected to the B connection of another adjacent flat coil disk.

7. A system as described in claim 6 in which the connection between two B connections having just as many flat coil disks preceding that connection as after that connection is the mid-point.

8. A system as described in claim 7 in which the flat coil disks adjacent to the mid-point have connections at substantially the same points on their conductive paths connected to pick-off means.

9. A system as described in claim 8 in which there are four flat coil disks in the plurality of flat coil disks.

10. Apparatus for determining the dielectric constant and/ore resistivity of earth formations in the vicinity of a borehole comprising:
    means for transmitting electromagnetic energy into the earth formation from a first location in the borehole at a frequency that enables the electromagnetic energy to propagate throughout the surrounding earth formations;
    a plurality of means for receiving electromagnetic energy spaced longitudinally from the transmitting means and providing signals representative of the electromagnetic field at the receiving means locations,
    each of said receiving means includes coil means for having the electromagnetic field induce a current therein representative of the strength of the electromagnetic field, the coil means having two end points and a mid-point located between the two end points,
    variable capacitor means connected across said coil means for forming a resonant circuit with said coil means tuned to a predetermined frequency, and pick-off means connected to the coil means at two connection points on the coil means in a manner so that two connection points are equidistant from the mid-point of the coil means and with each connection point being located between the mid-point and an end point for providing a signal representative of the magnetic component of the electromagnetic field and having substantially no electric field component; and means for determining the dielectric constant and/or resistivity of said earth formations in accordance with the signals from the pick-off means.

11. Apparatus as described in claim 10 in which the coil means is a cylindrical coil having its ends connected to the variable capacitor means.

12. Apparatus as described in claim 10 in which the coil means includes a plurality of serially connected flat coil disks, and mounting means for mounting the plurality of flat coil disks.

13. Apparatus as described in claim 12 in which each flat coil disk includes:

a disk of non-conductive material, a conductive path affixed to said disk in a spiral manner and having a connection A at one end of the conductive path and a connection B at the other end of the conductive path.

14. Apparatus as described in claim 13 in which the number of flat coil disks in said coil means is an even number.

15. Apparatus as described in claim 14 in which a first flat coil disk of the plurality of flat coil disks has its A connection connected to said variable capacitor means and its B connection connected to the B connection of the next subsequent flat coil disk, a last flat coil disk of the plurality of flat coil disks has its A connection connected to the variable capacitor means, and its B connection connected to the B connection of the next preceding flat coil disk, and each flat coil disk of the plurality of flat coil disks, except for the first and last flat coil disks, has its A connection connected to the A connection of an adjacent flat coil disk and its B connection connected to the B connection of another adjacent flat coil disk.

16. Apparatus as described in claim 15 in which the connection between two B connections having just as many flat coil disks preceding that connection as after that connection is the mid-point.

17. Apparatus as described in claim 16 in which the flat coil disks adjacent to the mid-point have connections, at substantially the same points on their conductive paths, connected to pick-off means.

18. Apparatus as described in claim 8 in which there are four flat coil disks in the plurality of flat coil disks.

19. Apparatus for determining the resistivity of earth formations in the vicinity of a borehole comprising:

means for transmitting electromagnetic energy into the earth formation from a first location in the borehole at a frequency that enables the electromagnetic energy to propagate throughout the surrounding earth formations but less than 10 MH;

a pair of means for receiving electromagnetic energy spaced longitudinally from the transmitting means and providing signals representative of the electromagnetic field at the receiving means locations, each of said receiving means includes coil means for having the electromagnetic field induce a current therein representative of the strength of the electromagnetic field, the coil means has two end points and a mid-point located between the two end points, variable capacitor means connected across said coil means for forming a resonant circuit with said coil means tuned to a predetermined frequency, and pick-off means connected to the coil means at two connection points on the coil means in a manner so that two connection points are equidistant from the mid-point of the coil means and with each connection point being located between the mid-point and an end point for providing a signal representative of the magnetic component of the electromagnetic field and having substantially no electric field component; and means for determining the resistivity of said earth formations in accordance with the signal from the pick-off means.

20. Apparatus as described in claim 19 in which the coil means is a cylindrical coil having its ends connected to the variable capacitor means.

21. Apparatus as described in claim 19 in which the coil means includes a plurality of serially connected flat coil disks, and mounting means for mounting the plurality of flat coil disks, 22. Apparatus as described in claim 21 in which each flat coil disk includes:

a disk of non-conductive material, a conductive path affixed to said disk in a spiral manner and having a connection A at one end of the conductive path and a connection B at the other end of the conductive path.

23. Apparatus as described in claim 22 in which the number of flat coil disks in said coil means is an even number.

24. Apparatus as described in claim 23 in which a first flat coil disk of the plurality of flat coil disks has its A connection connected to said variable capacitor meansw and its B connection connected to the B connection of the next subsequent flat coil disk, a last flat coil disk of the plurality of flat coil disks has its A connection connected to the variable capacitor means, and its B connection connected to the B connection of the next preceding flat coil disk, and each flat coil disk of the plurality of flat coil disks, except for the first and last flat coil disks, has its A connection connected to the A connection of an adjacent flat coil disk and its B connection connected to the B connection of another adjacent flat coil disk.

25. Apparatus as described in claim 24 in which the connection between two B connections having just as many flat coil disks prececing that connection as after that connection is the mid-point.

26. Apparatus as described in claim 25 in which the flat coil disks adjacent to the mid-point have connections at substantially the same points on their conductive paths connected to pick-off means.

27. Apparatus as described in claim 26 in which there are four flat coil disks in the plurality of flat coil disks.

* * * * *